United States Patent
Caine

(10) Patent No.: US 8,499,797 B1
(45) Date of Patent: Aug. 6, 2013

(54) VEHICLE BRAKE LINE DE-ICING DEVICE

(76) Inventor: James A. Caine, Hammond, IN (US)

(*) Notice: Subject to any disclaimer, the term of this patent is extended or adjusted under 35 U.S.C. 154(b) by 173 days.

(21) Appl. No.: 13/206,812

(22) Filed: Aug. 10, 2011

(51) Int. Cl.
*F16L 53/00* (2006.01)
(52) U.S. Cl.
USPC .............................................. 138/34; 138/27
(58) Field of Classification Search
USPC ....................................................... 138/27, 34
See application file for complete search history.

(56) References Cited

U.S. PATENT DOCUMENTS

| | | | |
|---|---|---|---|
| 2,147,288 A * | 2/1939 | Farmer et al. ................... | 138/34 |
| 4,763,875 A | 8/1988 | Chew | |
| 4,804,013 A | 2/1989 | Wilson | |
| 5,143,392 A | 9/1992 | Collins | |
| 5,293,904 A | 3/1994 | Wood | |
| 5,675,997 A | 10/1997 | Hulak | |
| 7,905,427 B2 * | 3/2011 | Arkashevski et al. ..... | 239/284.1 |
| 8,366,022 B2 * | 2/2013 | Arkashevski .............. | 239/284.1 |
| 8,371,327 B2 * | 2/2013 | Lebreux ..................... | 137/205.5 |
| 2009/0095367 A1 * | 4/2009 | Socha .............................. | 138/34 |
| 2010/0200671 A1 * | 8/2010 | Shank et al. .................... | 239/13 |

* cited by examiner

*Primary Examiner* — James Hook

(57) ABSTRACT

A vehicle brake line de-icing device for deicing the air brake lines of a tractor trailer or the like. The device is compact with a reservoir having flat sides for best chosen fit and/or mounting. The reservoir can selectively pivot and lock in differing rotational positions on the tubes on each end that are affixed to gladhand connectors for communicating with those on a vehicle. To thaw the brake lines, the user releases air through the brake lines and thereby circulates the antifreeze therethrough. This process thaws the brake lines in approximately 5 to 7 minutes, as opposed to an expensive 2-hour service call.

4 Claims, 3 Drawing Sheets

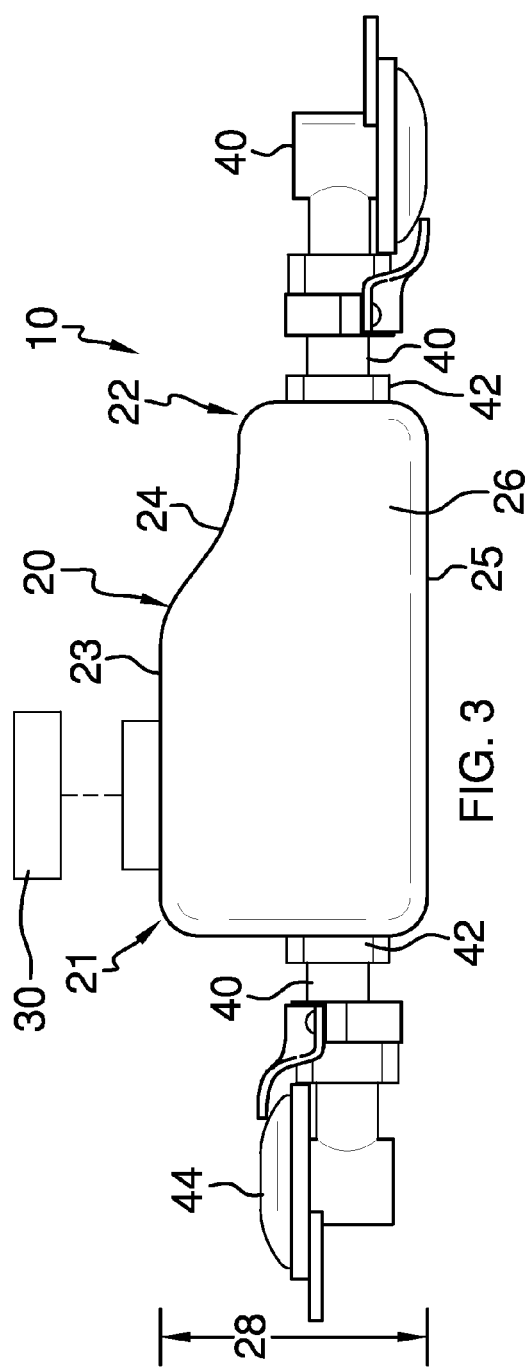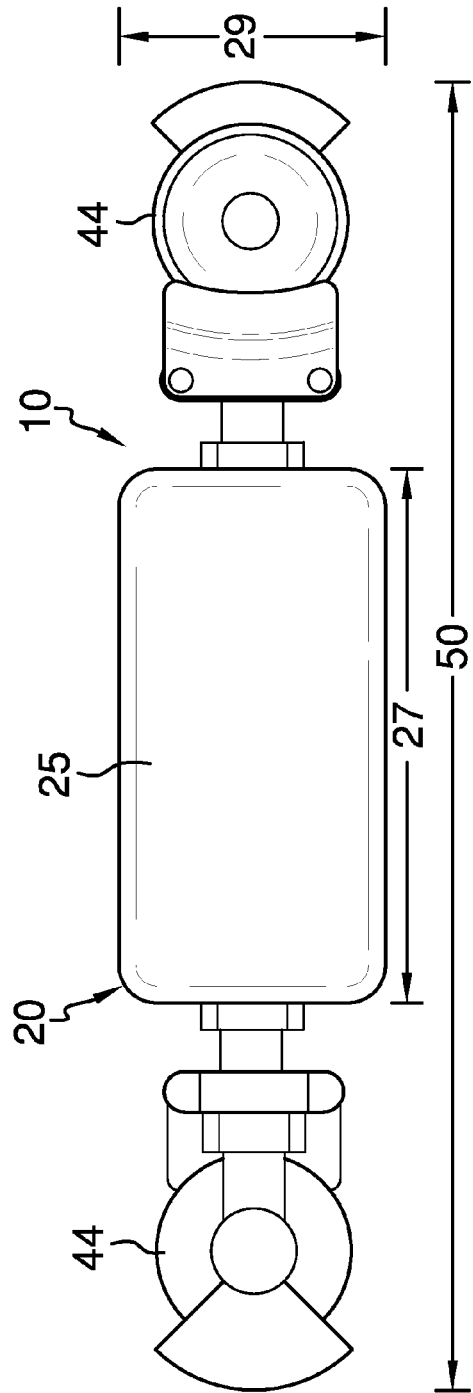

VEHICLE BRAKE LINE DE-ICING DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of vehicle brake line de-icing device are known in the prior art. However, what is needed is a small vehicle brake line de-icing device to quickly thaw a tractor-trailer's brake lines by connecting to the gladhand connectors of the tractor-trailer brake lines. The optimal sixe and shape of the present device properly provides these functions as well as providing for most ideal hookup capabilities.

FIELD OF THE INVENTION

The present invention relates to brake line de-icing devices, and more particularly, to a vehicle brake line de-icing device for quickly thawing a tractor-trailer's brake lines.

SUMMARY OF THE INVENTION

The general purpose of the present vehicle brake line de-icing device, described subsequently in greater detail, is to provide a vehicle brake line de-icing device which has many novel features that result in a vehicle brake line de-icing device which is not anticipated, rendered obvious, suggested, or even implied by prior art, either alone or in combination thereof.

Gladhand connectors disposed at opposite end of the device attach the device to the gladhand connectors in the brake lines of a vehicle. An antifreeze reservoir is centrally disposed between the gladhand connectors. A cap on the antifreeze reservoir allows the user to fill the antifreeze reservoir with antifreeze. To thaw the brake lines, the user release air through the brake lines and circulates the antifreeze therethrough. While not only thawing brake lines, the vehicle brake line de-icing device can also prevent the brake lines of a tractor-trailer from freezing in below-freezing weather conditions. The device height measures approximately 2½ inches overall. The device total length is approximately 14½" inches, with a width of about 2 inches. The reservoir measurements may be critical, with the reservoir having a reservoir height of 2 inches, a reservoir length of about 5½ inches, and a reservoir width of about 2 inches. There is a recession in the reservoir top to reduce volume. This reservoir will contain about 11 ounces of any form of antifreeze liquid. The reservoir volume is important in that sufficient volume of antifreeze must be introduced to the brake lines, but excessive antifreeze volume is not desirable. Excessive liquid volume can cause brake disruption, as liquid does not compress. Ridding an air brake system of excessive volume is time consuming. The threaded cap fits atop the reservoir. Gladhand connectors disposed at opposite ends of the device attach the device to the existing brake lines. The antifreeze reservoir is centrally disposed between the connectors. A cap on the antifreeze reservoir allows the user to fill the antifreeze reservoir with antifreeze.

To thaw the brake lines, the user releases air through the brake lines and thereby circulates the antifreeze therethrough. Antifreeze may be comprised of a chosen material, such as alcohol for example, or glycol products. This process thaws the brake lines 12 in approximately 5 to 7 minutes, rather than a 2-hour service call.

Thus has been broadly outlined the more important features of the present vehicle brake line de-icing device so that the detailed description thereof that follows may be better understood and in order that the present contribution to the art may be better appreciated.

An object of the vehicle brake line de-icing device is to de-ice air brake lines.

An object of the vehicle brake line de-icing device is to prevent icing of air brake lines.

Another object of the vehicle brake line de-icing device is to be easily attached and detached from existing brake lines.

An object of the vehicle brake line de-icing device is to provide for holding a desired amount of antifreeze liquid.

These together with additional objects, features and advantages of the improved vehicle brake line de-icing device will be readily apparent to those of ordinary skill in the art upon reading the following detailed description of presently preferred, but nonetheless illustrative, embodiments of the improved vehicle brake line de-icing device when taken in conjunction with the accompanying drawings.

BRIEF DESCRIPTION OF THE DRAWINGS

FIG. 3 is a lateral elevation view.
FIG. 4 is a bottom plan view.

DETAILED DESCRIPTION OF THE DRAWINGS

Figure 1:
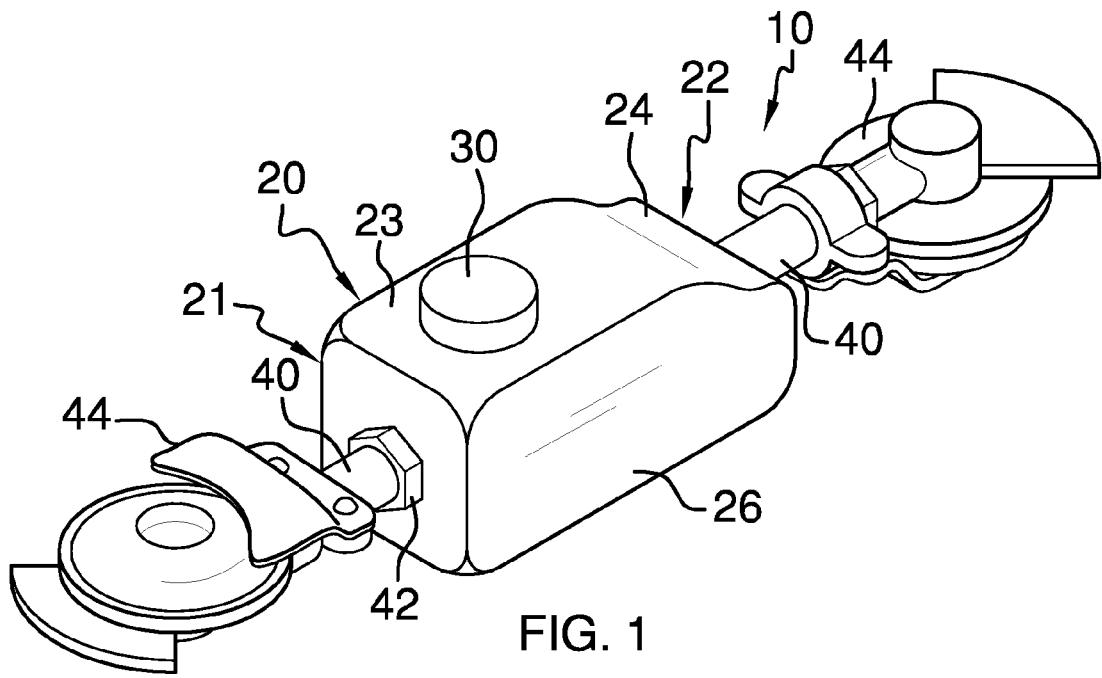
FIG. 1 is a top first end perspective view.

With reference now to the drawings, and in particular FIGS. 1 through 5 thereof, example of the instant vehicle brake line de-icing device employing the principles and concepts of the present vehicle brake line de-icing device and generally designated by the reference number 10 will be described.

Referring to FIG. 3, the device 10 partially comprises the liquid reservoir 20 having a first end 21 spaced apart from a second end 22. The top 23 is spaced apart from the bottom 25. The recession 24 is disposed within the top 23 adjacent to the second end 22. The reservoir 20 further comprises two spaced apart sides 26.

Referring to FIG. 4, the reservoir 20 length 27 is about 5½ inches.

Referring again to FIG. 3, the reservoir 20 height 28 is about 2 inches.

Referring again to FIG. 4, the reservoir 20 width 29 is about 2 inches;

Referring to FIG. 1 and again to FIG. 3, the removable cap 30 is disposed atop of the reservoir 20.

Figure 2:
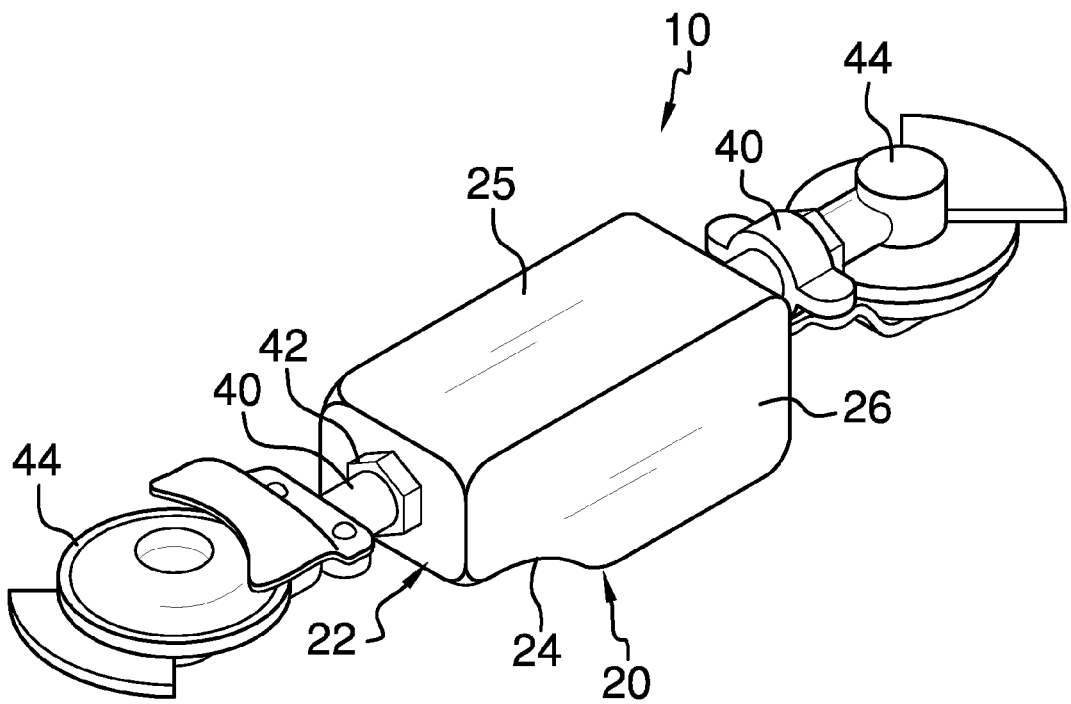
FIG. 2 is a bottom second end perspective view.

Referring to FIG. 2, a tube 40 exits each reservoir 20 end.

Referring again to FIG. 4, a lock nut 42 surrounding each tube 40 and is in selective locking contact with the reservoir 20. The reservoir 20 is selectively rotationally disposed about each tube 40.

A gladhand connector 44 is connected distally to each tube 40.

Referring to FIG. 3, the gladhand connectors 44 are 180 degrees in rotational separation. Each gladhand connector 44, though, may be rotated as chosen by loosening the lock nut 42. Tightening of the lock nut 42 can then positively rotationally locate the gladhand connector 44. This is an important feature in allowing a user to mount the device 10 in the most advantageous and convenient way on any given vehicle 14.

Referring to FIG. 4, the device advantageously comprises a total length 50 of only about 14½ inches.

Figure 5:
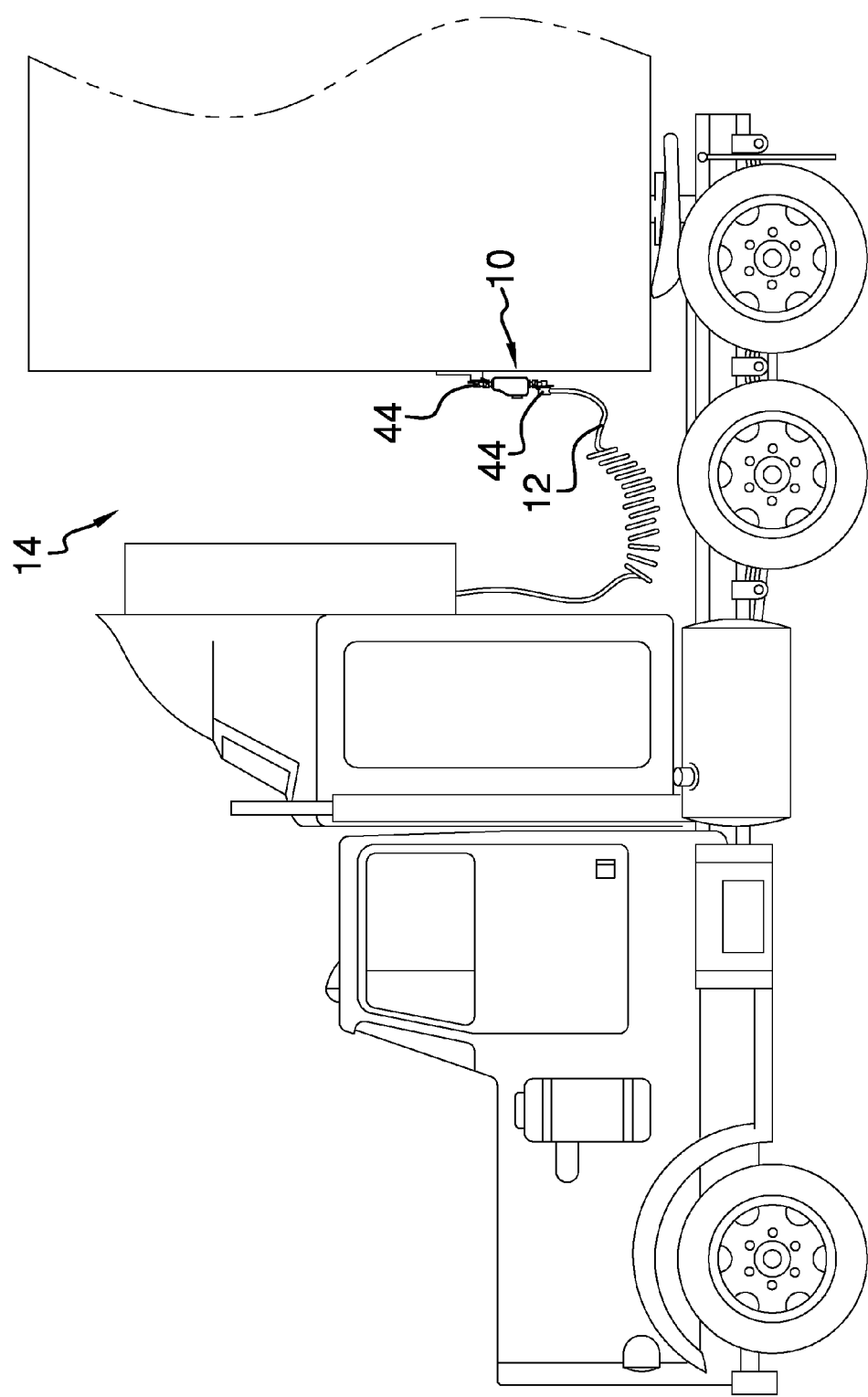
FIG. 5 is an in-use lateral elevation view, first end down.

Referring to FIG. 5, the gladhand connectors 44 are selectively attach the device 10 to an existing vehicle's 14 brake lines' 12 gladhand connectors 44.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the vehicle brake line de-icing device may be used.

What is claimed is:

1. A vehicle brake line de-icing device comprising, in combination:
   a liquid reservoir having a first end spaced apart from a second end, a top spaced apart from a bottom, a recession disposed within the top adjacent to the second end, and two spaced apart sides, a reservoir length of about 5½ inches, a reservoir height of about 2 inches, and a reservoir width of about 2 inches;
   a removable cap disposed atop of the liquid reservoir;
   a tube exiting each reservoir end;
   a lock nut surrounding each tube and in selective locking contact with the reservoir, whereby the reservoir is selectively rotationally disposed about each tube;
   a gladhand connector connected to each tube;
   whereby the gladhand connectors selective attach the device to an existing vehicle's brake line gladhand connectors.

2. The device according to claim 1 wherein the reservoir contains about 11 ounces of liquid.

3. The device according to claim 2 further comprising a total length of about 14½ inches.

4. The device according to claim 1 further comprising a total length of about 14½ inches.

\* \* \* \* \*